(12) United States Patent
Chopra et al.

(10) Patent No.: US 10,181,759 B2
(45) Date of Patent: Jan. 15, 2019

(54) DYNAMIC MUTUAL SENSING FOREIGN OBJECT DETECTION LOOPS

(71) Applicant: QUALCOMM Incorporated, San Diego, CA (US)

(72) Inventors: Swagat Chopra, Munich (DE); Leandro Percebon, Munich (DE)

(73) Assignee: Qualcomm Incorporated, San Diego, CA (US)

( * ) Notice: Subject to any disclaimer, the term of this patent is extended or adjusted under 35 U.S.C. 154(b) by 52 days.

(21) Appl. No.: 15/264,732

(22) Filed: Sep. 14, 2016

(65) Prior Publication Data

US 2018/0076671 A1 Mar. 15, 2018

(51) Int. Cl.
*H02J 50/60* (2016.01)
*H02J 50/10* (2016.01)
*B60L 11/18* (2006.01)
*G01V 3/10* (2006.01)
*H02J 7/02* (2016.01)

(52) U.S. Cl.
CPC ............. *H02J 50/60* (2016.02); *B60L 11/182* (2013.01); *B60L 11/1824* (2013.01); *G01V 3/10* (2013.01); *G01V 3/101* (2013.01); *G01V 3/104* (2013.01); *H02J 7/025* (2013.01); *H02J 50/10* (2016.02)

(58) Field of Classification Search
CPC ...... B60L 1/00; B60L 11/182; B60L 11/1824; G01V 3/10; G01V 3/101; G01V 3/104
See application file for complete search history.

(56) References Cited

U.S. PATENT DOCUMENTS

| 9,726,518 | B2 | 8/2017 | Widmer et al. |
| 2012/0112531 | A1* | 5/2012 | Kesler .................. B60L 11/182 307/9.1 |
| 2013/0241302 | A1 | 9/2013 | Miyamoto et al. |
| 2015/0260835 | A1 | 9/2015 | Widmer et al. |
| 2016/0006260 | A1 | 1/2016 | Nakamura et al. |
| 2016/0187519 | A1 | 6/2016 | Widmer et al. |

FOREIGN PATENT DOCUMENTS

| WO | 2013036947 A2 | 3/2013 |
| WO | 2015015495 A1 | 2/2015 |
| WO | 2015087328 A1 | 6/2015 |
| WO | 2015144268 A1 | 10/2015 |

OTHER PUBLICATIONS

International Search Report and Written Opinion—PCT/US2017/047089—ISA/EPO—dated Oct. 23, 2017.

* cited by examiner

*Primary Examiner* — Robert Deberadinis
(74) *Attorney, Agent, or Firm* — Hunter Clark PLLC

(57) ABSTRACT

Techniques for detecting a presence of a foreign object within a region for wirelessly transferring power to charge an electric vehicle are discloses. An example apparatus according to the disclosure includes a foreign object detection (FOD) structure including a transmitting loop structure, a receiving loop structure galvanically isolated from the transmitting loop structure and positioned relative to the transmitting loop structure such that a magnetic field generated by the transmitting loop structure induces a first voltage in the receiving loop structure, wherein the first voltage is below a threshold value, and a control circuit configured to drive the transmitting loop structure and detect a change in a magnitude of the first voltage in the receiving loop structure in response to the presence of the foreign object within the magnetic field.

29 Claims, 13 Drawing Sheets

DYNAMIC MUTUAL SENSING FOREIGN OBJECT DETECTION LOOPS

FIELD

This application is generally related to wireless power charging of chargeable devices such as electric vehicles, and more specifically to systems and methods for detecting foreign metallic objects in the charging path.

BACKGROUND

Chargeable systems, such as vehicles, have been introduced that include locomotion power derived from electricity received from an energy storage device such as a battery. Vehicles that are solely electric generally receive the electricity for charging the batteries from other sources. Battery electric vehicles are often proposed to be charged through some type of wireless charging system that is capable of transferring power in free space (e.g., via a wireless field). Some such systems may provide wireless power to the vehicle while the vehicle is located on the roadway, in motion or stationary. Foreign metallic objects interposed between the charging pad and the vehicle may create a safety issue since the intense magnetic fields generated by the charging pad may cause the foreign metallic object to heat up.

SUMMARY

An example of an apparatus for detecting a presence of a foreign object within a region for wirelessly transferring power to charge an electric vehicle, according to the disclosure includes a foreign object detection (FOD) structure including a transmitting loop structure, a receiving loop structure galvanically isolated from the transmitting loop structure and positioned relative to the transmitting loop structure such that a magnetic field generated by the transmitting loop structure induces a first voltage in the receiving loop structure, such that the first voltage is below a threshold value, and a control circuit configured to drive the transmitting loop structure and detect a change in a magnitude of the first voltage in the receiving loop structure in response to the presence of the foreign object within the magnetic field.

Implementations of such an apparatus may include one or more of the following features. The control circuit may be configured to drive the transmitting loop structure based on previously stored transmission signal parameters and to detect the change in the magnitude of the first voltage in the receiving loop structure based on expected received signal parameters, wherein the expected received signal parameters are associated with the transmission signal parameters. A data structure may be operably coupled to the control circuit, such that the data structure includes a first field to identify the receiving loop structure, and a second field to identify the threshold value associated with the receiving loop structure. The transmitting loop structure may be a double-D configuration. The receiving loop structure may be a double-D configuration. The receiving loop structure may be a circular configuration. A transmitter magnetic flux direction of the transmitting loop structure may be different from a receiver magnetic flux direction of the receiving loop structure. The control circuit may be configured to cause a wireless transfer of power to cease if the change in the magnitude of the first voltage in the receiving loop structure is above a detection threshold value. A plurality of FOD loop structures may be arranged in an array over a charging area, each of the plurality of FOD loop structures may include the transmitting loop structure and the receiving loop structure, such that the control circuit is configured to drive each of the transmitting loop structures and detect changes in the magnitude of the first voltage in each of the receiving loop structures. The control circuit may be configured to cause a wireless transfer of power to cease if the change in the magnitude of the first voltage in one of the receiving loop structures is above the detection threshold value associated with that one of the receiving loop structures. The control circuit is configured to drive the transmitting loop structure at a frequency between 1 MHz and 10 MHz.

An example of a method of detecting a foreign object on a wireless charging base pad according to the disclosure includes determining a transmission signal and an expected received signal for a foreign object detection (FOD) loop, wherein the FOD loop includes a transmitting loop and a receiving loop, generating the transmission signal on the transmitting loop, measuring a received signal with the receiving loop, and detecting a foreign object based on a comparison of the received signal with the expected received signal.

Implementations of such a method may include one or more of the following features. The transmitting loop may be a double-D, circular, or circular-rectangular configuration. The receiving loop may be a double-D, circular, or circular-rectangular configuration. The FOD loop may be one of a plurality of FOD loops in an FOD array. The transmission signal and the expected received signal for each of the plurality of FOD loops in the FOD array may be determined. The transmission signal and the expected received signal may be received via a network interface, or via a memory unit. The transmission signal may include an amplitude value and a frequency value. The expected received signal may include an amplitude value. The expected received signal may include a phase difference value.

An example of a foreign object detection apparatus according to the disclosure includes a transmitting loop structure in a first magnetic flux orientation, a receiving loop structure in a second magnetic flux orientation, such that the receiving loop structure is galvanically isolated from the transmitting loop structure and positioned relative to the transmitting loop structure such that a magnetic field generated by the transmitting loop structure generates an expected electrical characteristic in the receiving loop structure, a control circuit configured to drive the transmitting loop structure and detect a change in the expected electrical characteristic in the receiving loop structure in response to a presence of a foreign object within the magnetic field, and a memory unit operably coupled to the control circuit and configured to store an expected electrical characteristic value corresponding to the expected electrical characteristic value the transmitting loop structure generates in the receiving loop structure.

Implementations of such a foreign object detection apparatus may include one or more of the following features. The first magnetic flux orientation and the second magnetic flux orientation may be the same. The expected electrical characteristic in the receiving loop structure may be approximately a zero voltage value. The transmitting loop structure may be a double-D configuration. The receiving loop structure may be a double-D configuration. The changes in the expected electrical characteristic may include a phase change appearing in the receiving loop structure in response to the presence of the foreign object within the magnetic field. A plurality of Foreign Object Detection (FOD) loop structures may be arranged in an array over a charging area, each of the plurality of FOD loop structures may include the transmitting loop structure and the receiving loop structure, such that the control circuit is configured to drive each of the transmitting loop structures and detect changes in an electrical characteristic in each of the receiving loop structures. The memory unit may be configured to store an electrical characteristic value corresponding to the electrical characteristic values for each of the transmitting loop structures in the plurality of FOD loop structures. Each of the transmitting loop structures in the plurality of FOD loop structures may be in the first magnetic flux orientation, and each of the receiving loop structures in the plurality of FOD loop structures may be in the second magnetic flux orientation.

An example of an apparatus for detecting a foreign object according to the disclosure includes means for determining a transmission signal and an expected received signal for a foreign object detection (FOD) loop, wherein the FOD loop includes a transmitting loop means in a first magnetic flux orientation and a receiving loop means in a second magnetic flux orientation such that an induced voltage in the receiving loop means is approximately zero in the absence of a foreign object, means for generating the transmission signal on the transmitting loop means, means for measuring a received signal with the receiving loop means, and means for detecting a foreign object based on a comparison of the received signal with the expected received signal. In an implementation, the apparatus may also include means for storing the expected received signal.

Items and/or techniques described herein may provide one or more of the following capabilities, as well as other capabilities not mentioned. A foreign object on a charging pad may be detected. A foreign object detection (FOD) loop may include an active transmitting loop and a passive receiving loop. The transmitting loop and the receiving loop may be concentric. The transmitting loop is excited with an electrical signal. The presence of a foreign object in proximity to the transmitting loop causes a voltage to be induce in the receive coil. The transmitting loop may be excited with a specific frequency and a narrow band filter may be implemented on the receiver loop to increase the signal-to-noise ratio. The transmitting loop may be in a double-D configuration. The receiving loop may be in a double-D configuration. An array of FOD loops may be disposed over a charging surface. One or more electrical characteristics for each of the FOD loops in the array may be stored in memory. The electrical characteristics include an expected amplitude and an expected phase difference between the voltage induced on the receiver loop and the signal transmitted from the transmitting loop. The stored electrical characteristics may be used to determine of a foreign object is present. The stored electrical characteristics may be used as default values when a charging system is initialized. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer. Foreign metal objects disposed within the wireless field may degrade the power transfer and/or create safety issues due to heat generated within the foreign object.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
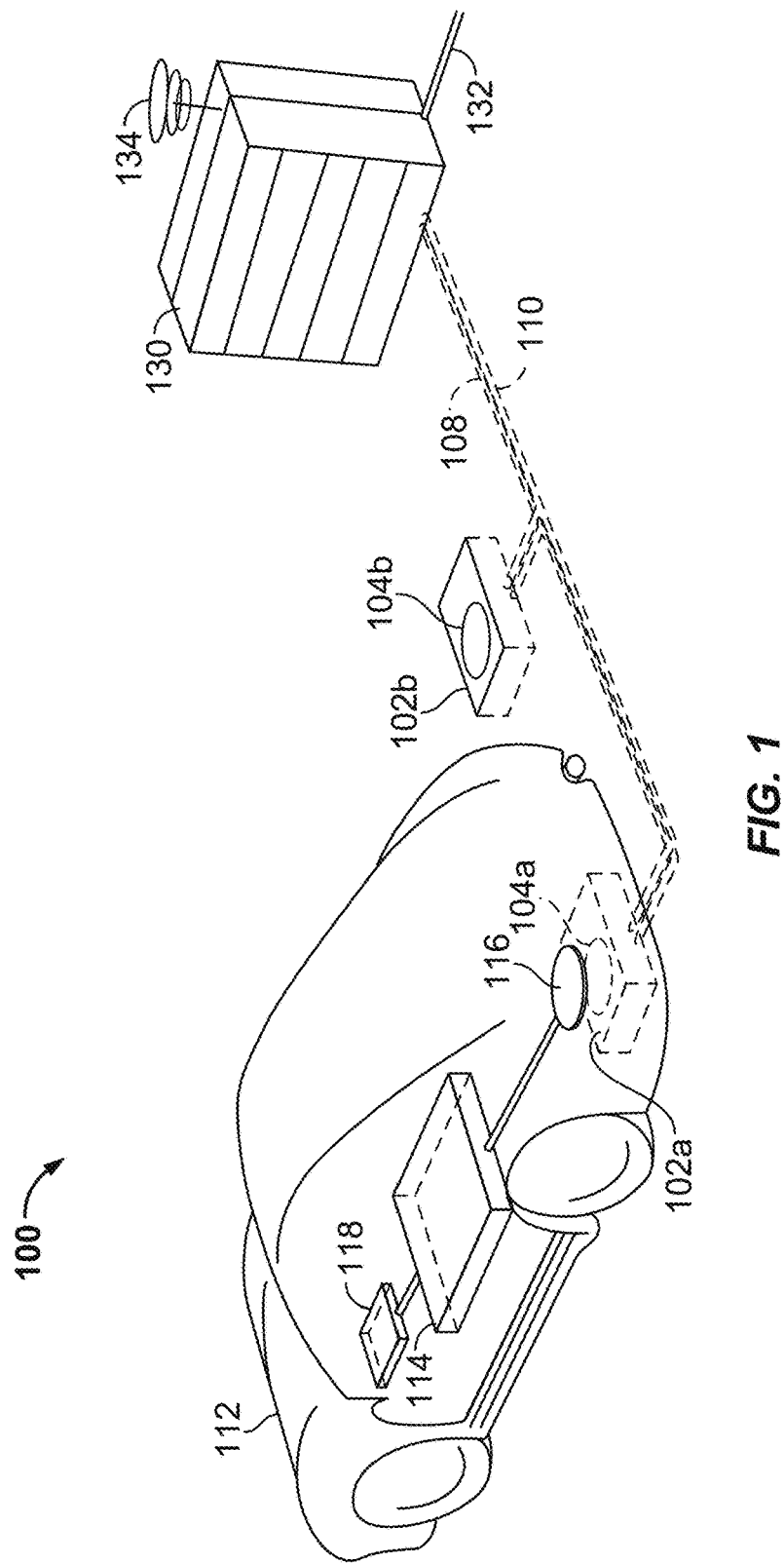
FIG. 1 is a diagram of an exemplary wireless power transfer system for charging an electric vehicle.

Referring to FIG. 1, a diagram of an exemplary wireless power transfer system 100 for charging an electric vehicle 112 is shown. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a. While a static charging configuration is depicted in FIG. 1, the foreign object detection loops described herein may also be implemented in dynamic charging configurations such as with a base array network (BAN).

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below. Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians. A potential safety issue, however, may arise when metallic foreign objects are located in the near-field generated by the base system induction coil 104a or the vehicle induction coil 116 (e.g., in a V2G configuration). The magnetic energy in the near-field may be transformed into thermal energy within a metallic foreign object, thus creating a fire hazard.

Figure 2:
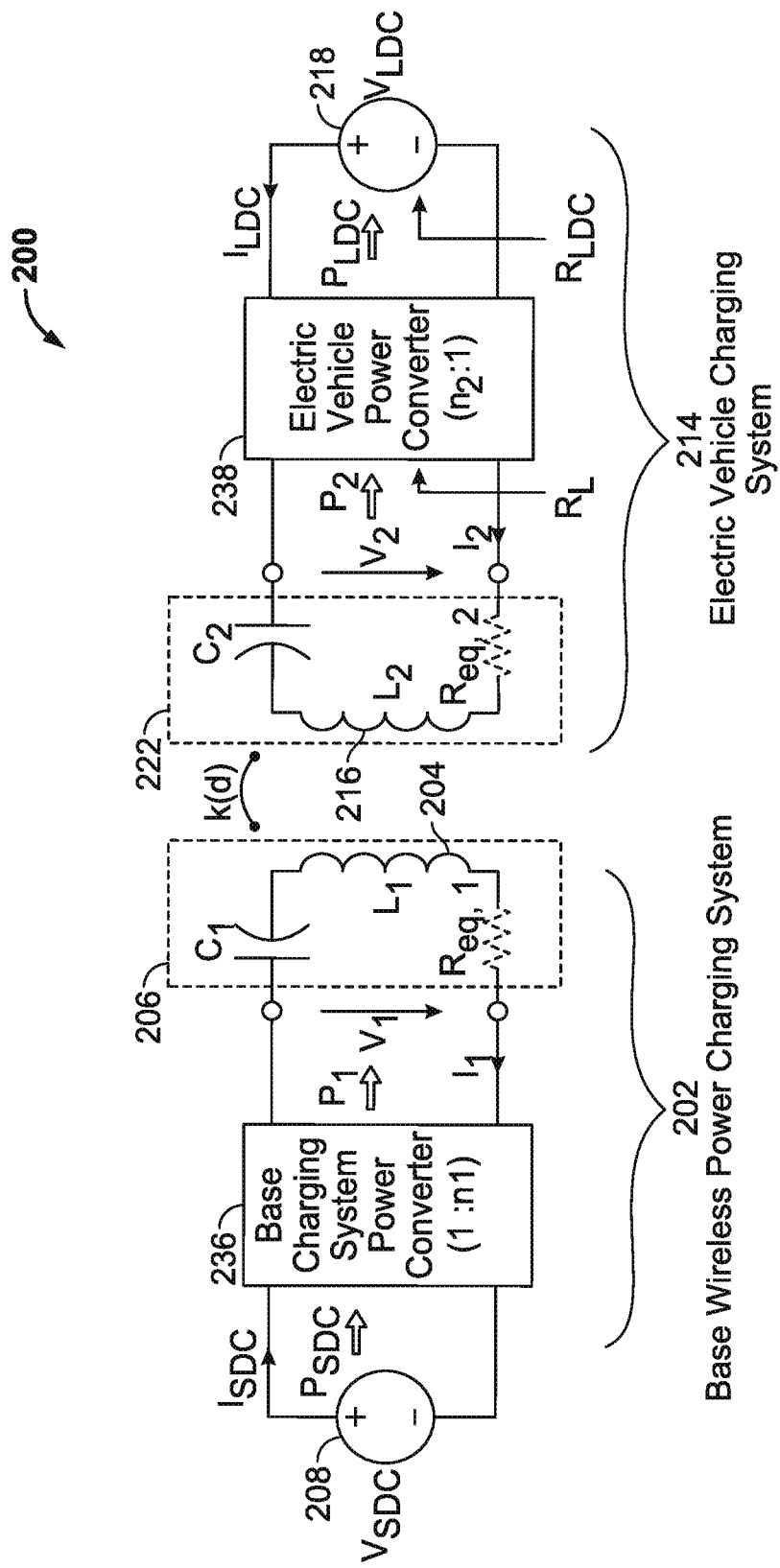
FIG. 2 is a schematic diagram of exemplary core components of the wireless power transfer system of FIG. 1.

Referring to FIG. 2, a schematic diagram of exemplary core components of the wireless power transfer system 100 of FIG. 1 is shown. The wireless power transfer system 200 may include a base system transmit circuit 206 including a base system induction coil 204 having an inductance L1. The wireless power transfer system 200 further includes an electric vehicle receive circuit 222 including an electric vehicle induction coil 216 having an inductance L2. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

A power supply 208 (e.g., AC or DC) supplies power PSDC to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power P1 to the base system transmit circuit 206 including the capacitor C1 in series with the base system induction coil 204 to emit an electromagnetic field at a desired frequency. The capacitor C1 may be provided to form a resonant circuit with the base system induction coil 204 that resonates at a desired frequency. The base system induction coil 204 receives the power P1 and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor C2 and electric vehicle induction coil 116. The capacitor C2 may be provided to form a resonant circuit with the electric vehicle induction coil 216 that resonates at a desired frequency. Element k(d) represents the mutual coupling coefficient resulting at coil separation. Equivalent resistances Req,1 and Req,2 represent the losses that may be inherent to the induction coils 204 and 216 and the anti-reactance capacitors C1 and C2. The electric vehicle receive circuit 222 including the electric vehicle induction coil 316 and capacitor C2 receives power P2 and provides the power P2 to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power PLDC to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle wireless charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle wireless charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling. The coils may be litz wire.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. Inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high native quality (Q) factor to lower the losses of the induction coil and to increase efficiency of the inductive coupling system.

Figure 3:
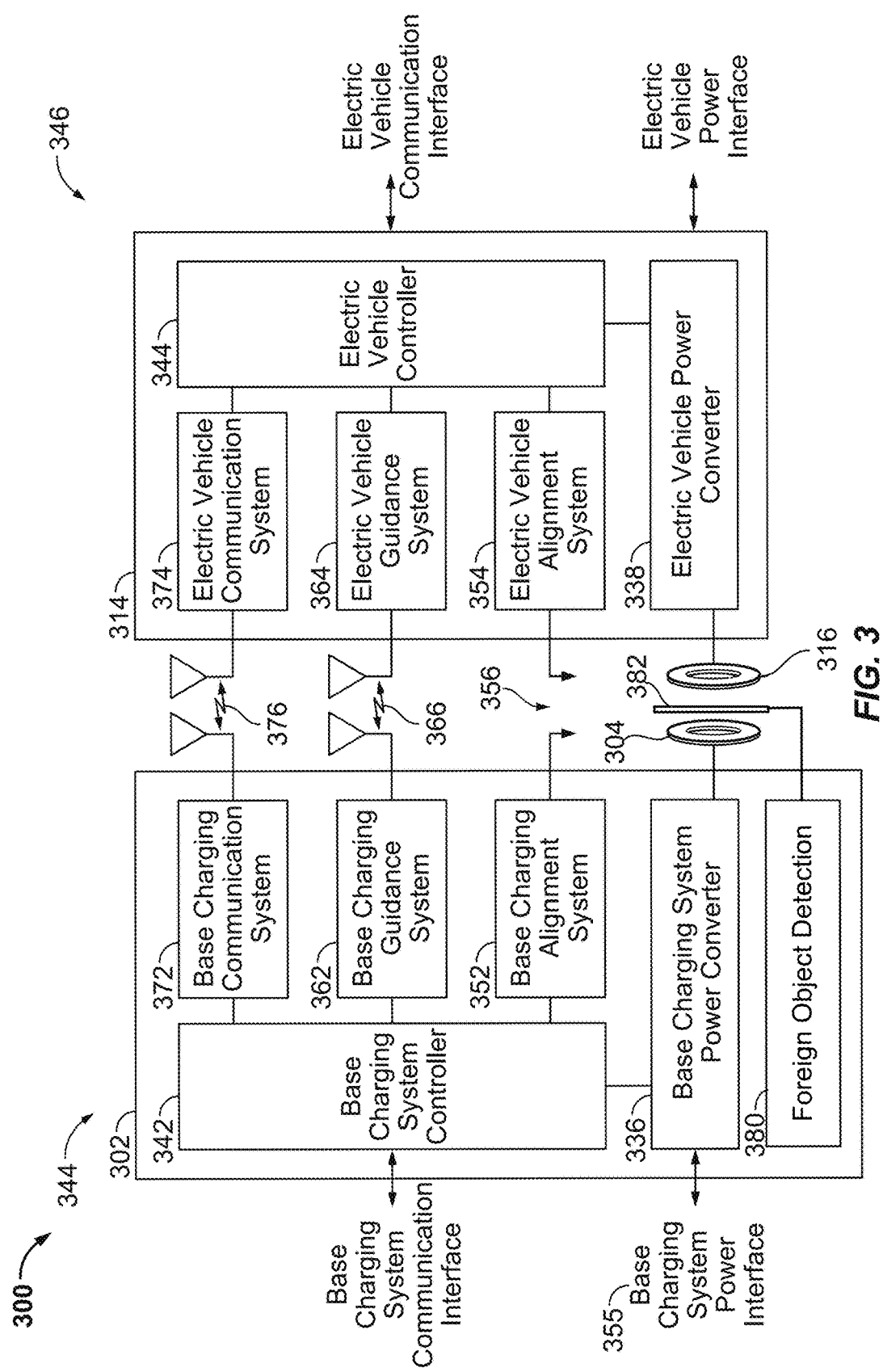
FIG. 3 is another functional block diagram showing exemplary core and ancillary components of the wireless power transfer system of FIG. 1.

Referring to FIG. 3, another functional block diagram showing exemplary core and ancillary components of the wireless power transfer system 300 of FIG. 1 is shown. The wireless power transfer system 300 illustrates a foreign object detection module 380, a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 355 may be configured to provide power to a charging system power converter 336 from a power source, such as an AC or DC power supply. The base charging system power converter 336 may receive AC or DC power from the base charging system power interface 355 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. The base charging system controller 342 may be operably coupled to a foreign object detection module 380 and one or more foreign object detection loops 382. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, foreign object detection information, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle wireless charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of foreign metal objects near the base system induction coil 304 (e.g., via the FOD loop 382) that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-150 kHz and particularly in the range from 80-90 kHz. This low frequency coupling may allow highly efficient power conversion that may be achieved using solid state devices. In addition, there may be less coexistence issues with radio systems compared to other bands.

Figure 4:
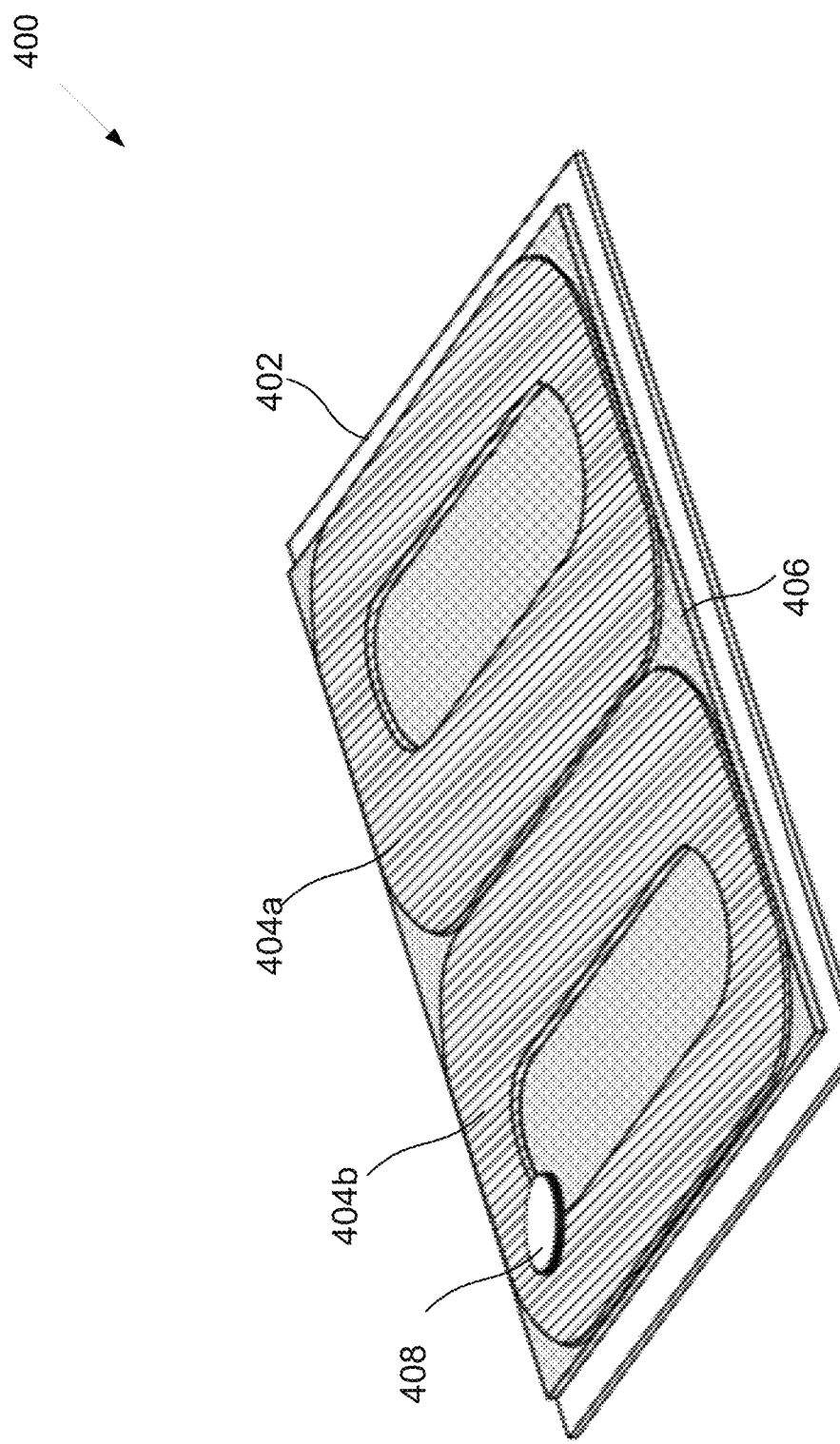
FIG. 4 is a perspective illustration of a magnetic flux device with a foreign object.

Referring to FIG. 4, with further reference to FIG. 3, a perspective illustration 400 of a magnetic flux device 402 with a foreign object 408 is shown. As an example, the magnetic flux device 402 is configured as a double-D, full-size coil with a ferrite layer configured to transmit or receive magnetic flux to or from a space beyond the magnetic flux device. The double-D configuration is exemplary only and not a limitation as other configurations such as circular, bi-polar, and solenoid type may be used. As used herein, the term "magnetic flux device" has its broadest reasonable interpretation, including but not limited to, a base pad, a vehicle pad, or other type of magnetic flux pad, and is not restricted to any particular shape, dimensions, or combination of components. As used herein, the term "pad" has its broadest reasonable interpretation, including but not limited to, a device (e.g., a base pad, a vehicle pad) configured for use in a wireless electric vehicle charging system, and is not restricted to any particular shape, dimensions, or combination of components. The magnetic flux device 402 comprises at least a first electrically conductive coil 404a and a second electrically conductive coil 404b. The first coil 404a is substantially planar and has a first periphery bounding a first area. The second coil 404b is substantially planar and has a second periphery bounding a second area. The second coil 404b is substantially coplanar with the first coil 404a. The magnetic flux device 402 further comprises a magnetically permeable material 406 having a substantially planar surface and having a third periphery bounding a third area. The magnetically permeable material 406 is sometimes referred to herein as a "core." As used herein, the term "core" has its broadest reasonable interpretation, which in particular, is not to limited to being in a central location or being wrapped around by other components. The magnetically permeable material 406 can be magnetically associated with at least the first coil 404a and the second coil 404b. The first coil 404a and the second coil 404b are substantially parallel to the substantially planar surface. A ratio of a sum of the first area and the second area to the third area is in a range between 0.9 and 1.1. The magnetic flux device 402 may be enclosed in an insulating shell (not shown) to provide electrical isolation and protection from the environment. A foreign object 408 is located within the area of magnetic flux transmitted by the magnetic flux device 402. The foreign object 408 represents any metallic object such as coins, nuts, bolts, washers, beverage cans, or any other metallic object that may be found in proximity to the magnetic flux device 402 and creating a potential safety hazard due to induction heating of the foreign object.

Figure 5:
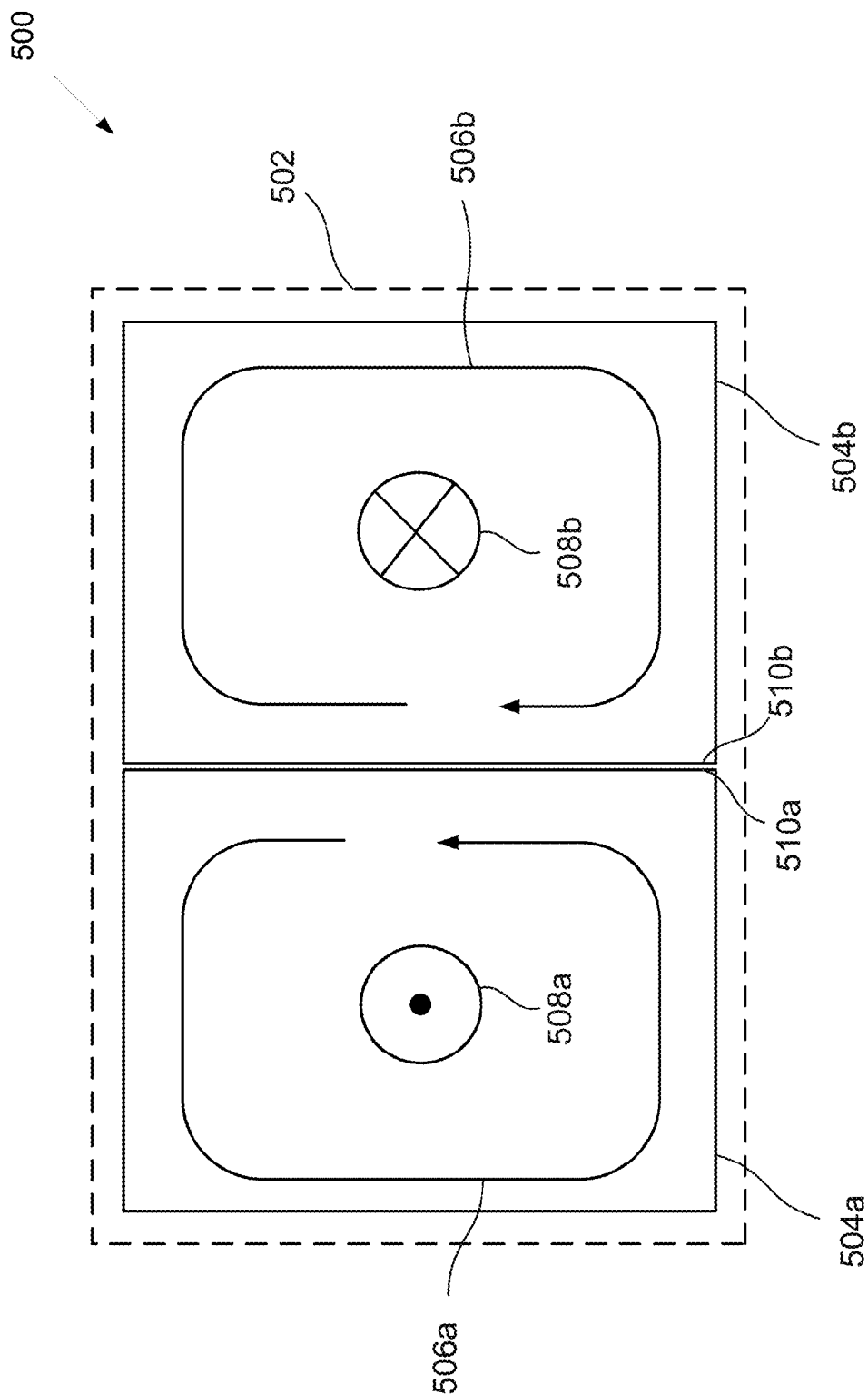
FIG. 5 is a schematic diagram of a foreign object detection (FOD) loop.

Referring to FIG. 5, a schematic diagram of a foreign object detection (FOD) loop 500 is shown. The FOD loop 500 includes a receiver loop 502 (shown with a dashed line) and a transmitter loop in a double-D configuration with a first transmitter loop 504a and a second transmitter loop 504b. A first transmitter loop current flow indicator 506a depicts the flow of electrical current within the first transmitter loop 504a, and a first transmitter loop magnetic flux indicator 508a depicts the direction of the magnetic flux generated by the electrical current flowing in the first transmitter loop 504a. A second transmitter loop current flow indicator 506b depicts the flow of electrical current within the second transmitter loop 504b (i.e., out of the page), and a second transmitter loop magnetic flux indicator 508b depicts the direction of the magnetic flux generated by the electrical current flowing in the second transmitter loop 504b (i.e., into the page). The first transmitter loop 504a includes a first inner portion 510a, and the second transmitter loop 504b includes a second inner portion 510b. The first and second inner portions 510a-b are the sections of the loops that are adjacent to one another. As depicted in FIG. 5, the current flows in the same direction in both the first and second inner portions 510a-b, which results in the two magnetic poles and flux to arch horizontally over the center of the FOD loop 500. The current flows through the In operation, the FOD loop 500 may be used to sense the presence of a foreign object based on measured electrical characteristics in the concentric receiver loop 502. As an example, and not a limitation, the amplitude and phase of an induced voltage in the receiver loop 502 may be measured. Electric current with a specific amplitude and phase is injected into the transmitter loop (e.g., the first transmitter loop 504a and the second transmitter loop 504b), and the induced voltage is measured in the receiver loop 502. The transmitter loop (504a, 504b) and the receiver loop 502 are substantially concentric and share the same outer dimensions. If there is no foreign metal object in the magnetic flux generated by the transmitter loops, the net magnetic flux captured by the receiver loop 502 is at a minimum value (e.g., zero or near zero (e.g. less than 1%)). If an object with properties that can modified the magnetic flux created by transmitter loop (e.g., 504a, 504b), a non-zero net flux passing through receiver loop 502 is created, thereby inducing a voltage across the receiver loop 502 terminals which can be sensed and analyzed for post processing. The concentric transmitter and receiver loops in the example FOD loop 500 are less susceptible to noise generated by an inductive power transfer system (e.g., magnetic flux device 402) and thus may provide improved sensitivity for foreign object detection.

Figure 6:
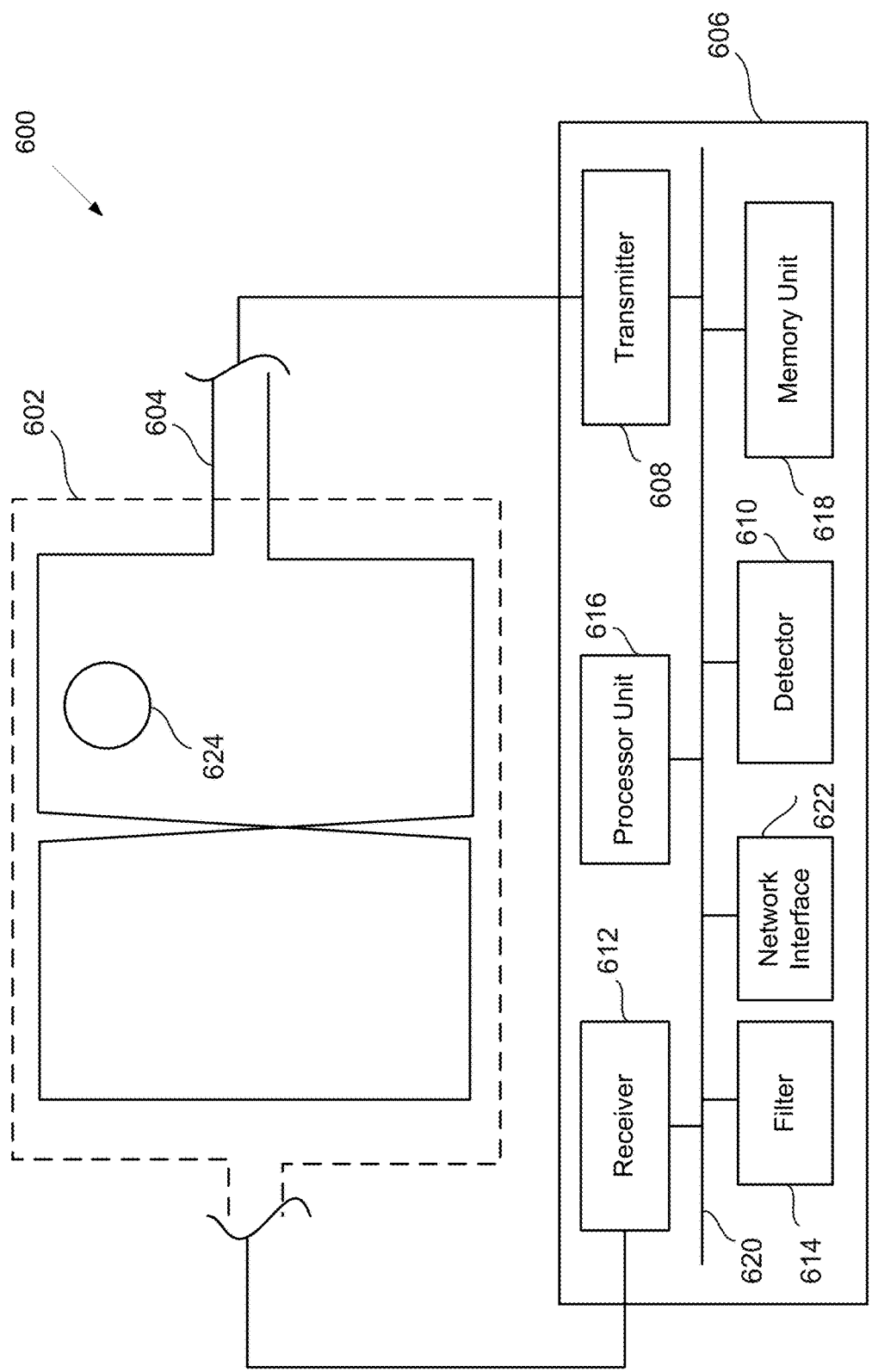
FIG. 6 is a functional block diagram of a FOD system.

Referring to FIG. 6, with further reference to FIG. 5, a functional block diagram of a FOD system 600 is shown. The FOD system 600 includes a FOD loop with a receiving loop 602 and a transmitter loop 604 operably coupled to a control circuit 606. While only one loop is shown, the receiving loop 602 and the transmitter loop 604 may include multiple loops of an insulated conductor (e.g., wire). For example, the receiving loop 602 may include 10 turns of wire and the transmitter loop 604 may include 4 turns of wire in a figure-eight pattern as shown in FIG. 6. The control circuit 606 may be a part of the foreign object detection module 380 (FIG. 3), and may include a transmitter 608, a detector 610, a receiver 612, a filter 614, a processor unit 616 (possibly including multiple processors, multiple cores, multiple nodes, and/or implementing multi-threading, etc.), a memory unit 618, a network interface 622, and bus 620. While the control circuit 606 includes components configured for digital signal processing, analog signal processing components and techniques may be used. The memory unit 618 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The control circuit 606 also includes a bus 620 (e.g., PCI, ISA, PCI-Express, HyperTransport®, InfiniBand®, NuBus, AHB, AXI, etc.), and network interface 622 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The transmitter 608 is configured to inject an electric signal into the transmitter loop 604. The amplitude and frequency of the transmitter signal may vary based on the size of the transmitter loop 604, as well as the dimensions of an FOD array if more than FOD loop structure is present. In an example, the frequency of the transmitted signal is in the range of 1-10 MHz. A specific frequency may be selected in an effort to minimize interference from the harmonic signals radiating from a base pad (e.g., 85 kHz is a typically charging frequency). The amplitude of the transmitted signal may vary based on the structure of the FOD loop and/or performance requirements such as a desired sensitivity of the FOD loop. In an example, the amplitude of the transmitted signal is in the range of 1-5 Volts peak to peak. The receiver 612 is configured to detect a change in current on the receiving loop 602 corresponding to the transmitted frequency output from the transmitter loop 604. The filter 614 may be configured as a narrow bandpass filter to improve the signal to noise ratio of the received signal. The detector 610 may be an analog or digital signal processing system configured to detect changes of the induced voltage and a phase difference in the received signal. The presence of a foreign object 624 will cause variations in the magnitude and phase of the received signal as compared to a signal when no foreign object is present. In an embodiment, in addition to receiving the output of the filter 614, the detector 610 may be configured to also detect changes in the transmitted signal due to the presence of the foreign object 624. For example, the impedance of the transmitter loop 604 and the corresponding reflected power may change when a foreign object is interacting with the transmitted signal. The detector 610 is a means for detecting changes in the electrical characteristics of the receiving loop structure. Any one of these functionalities may be partially (or entirely) implemented in hardware and/or on the processor unit 616. For example, the functionality may be implemented with an application specific integrated circuit, in logic implemented in the processor unit 616, in a co-processor on a peripheral device or card, etc. Further, realizations may include fewer or additional components not illustrated in FIG. 6 (e.g., video cards, audio cards, additional network interfaces, peripheral devices, etc.). The transmitter 608, detector 610, receiver 612, filter 614, processor unit 616, the memory unit 618, and the network interface 622 are coupled to the bus 620. Although illustrated as being coupled to the bus 620, the memory unit 618 may be coupled to the processor unit 616.

Figure 7A:
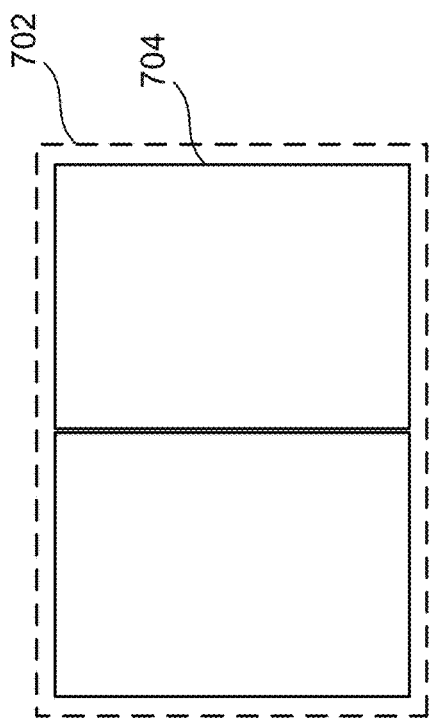
FIGS. 7A-7D are schematic diagrams of exemplary FOD loop configurations.
Figure 7B:
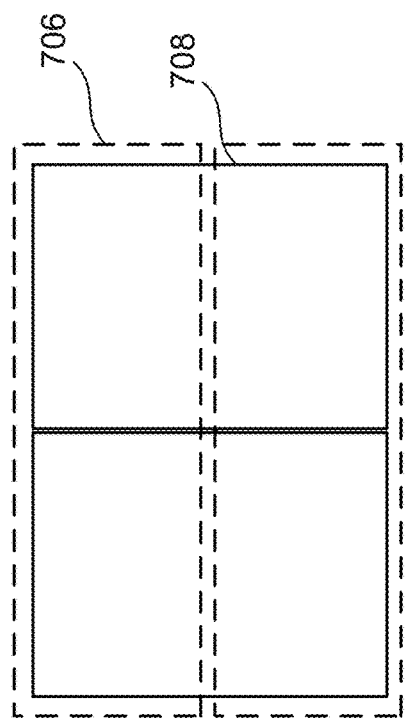
Figure 7C:
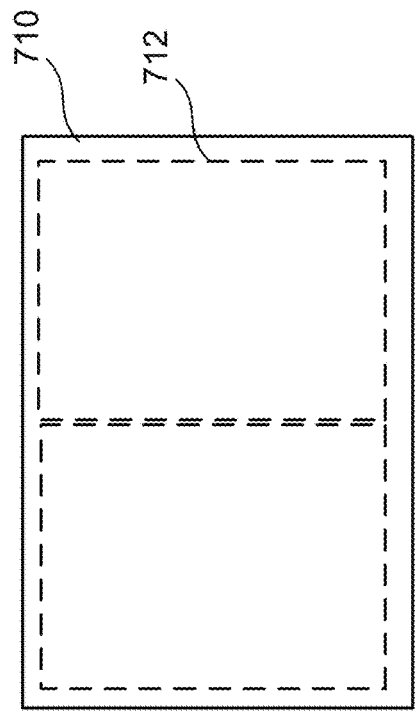
Figure 7D:
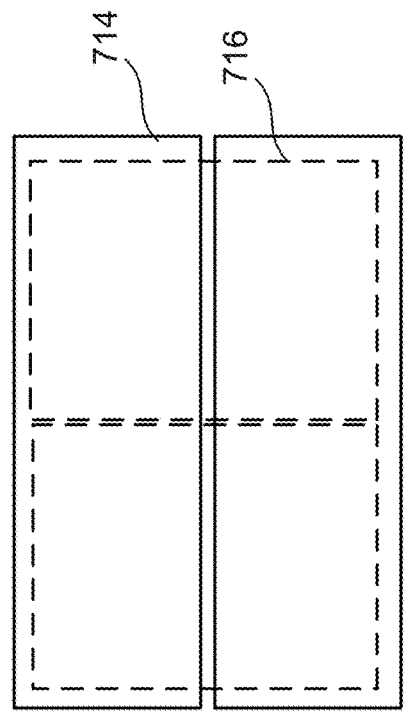

Referring to FIGS. 7A-7D, with further reference to FIG. 6, schematic diagrams of exemplary FOD loop configurations are shown. Each of the configurations includes a transmitter loop (indicated with solid lines), and a receiver loop (indicated with dashed lines). Each of the FOD loop configurations in FIGS. 7A-7D are examples of a receiving loop structure that is galvanically isolated from a transmitting loop structure and positioned relative to the transmitting loop structure such that the magnetic field generated by the transmitting loop structure does not induce a voltage in the receiving loop structure in the absence of any type of object that could distort the field. FIG. 7A illustrates a receiving loop 702 with a double-D transmitter loop 704 such as described in FIG. 6. FIG. 7B illustrates a double-D receiver loop 706 with a double-D transmitter loop 708. In an example, the double-D receiver and transmitter loops may be achieved via one or more figure-eight windings around an insulated frame. Other winding configurations may also be used. FIG. 7C illustrates a double-D receiver loop 712 disposed within a transmitting loop 710. FIG. 7D illustrates a double-D transmitter loop 714 with a double-D receiver loop 716. As an example, the length and width dimensions of the FOD loops may range between 40 mm×28 mm to 200 mm×150 mm. The dimensions may also vary based on other charging system dimensions (e.g., base pad size) and performance requirements (e.g., sensitivity). The rectangular shapes and orientations of the FOD loops in FIGS. 7A-7D are exemplary only, and not a limitation, as other orientations and geometric antenna shapes with different magnetic flux directions may be used (e.g., circular, circular-rectangle, oval, triangular, or other polygons). In an example, the orientations and shapes and the corresponding magnetic flux directions of the transmitting loop(s) may be different than the receiving loop(s) (e.g., horizontal/vertical configuration).

Figure 8:
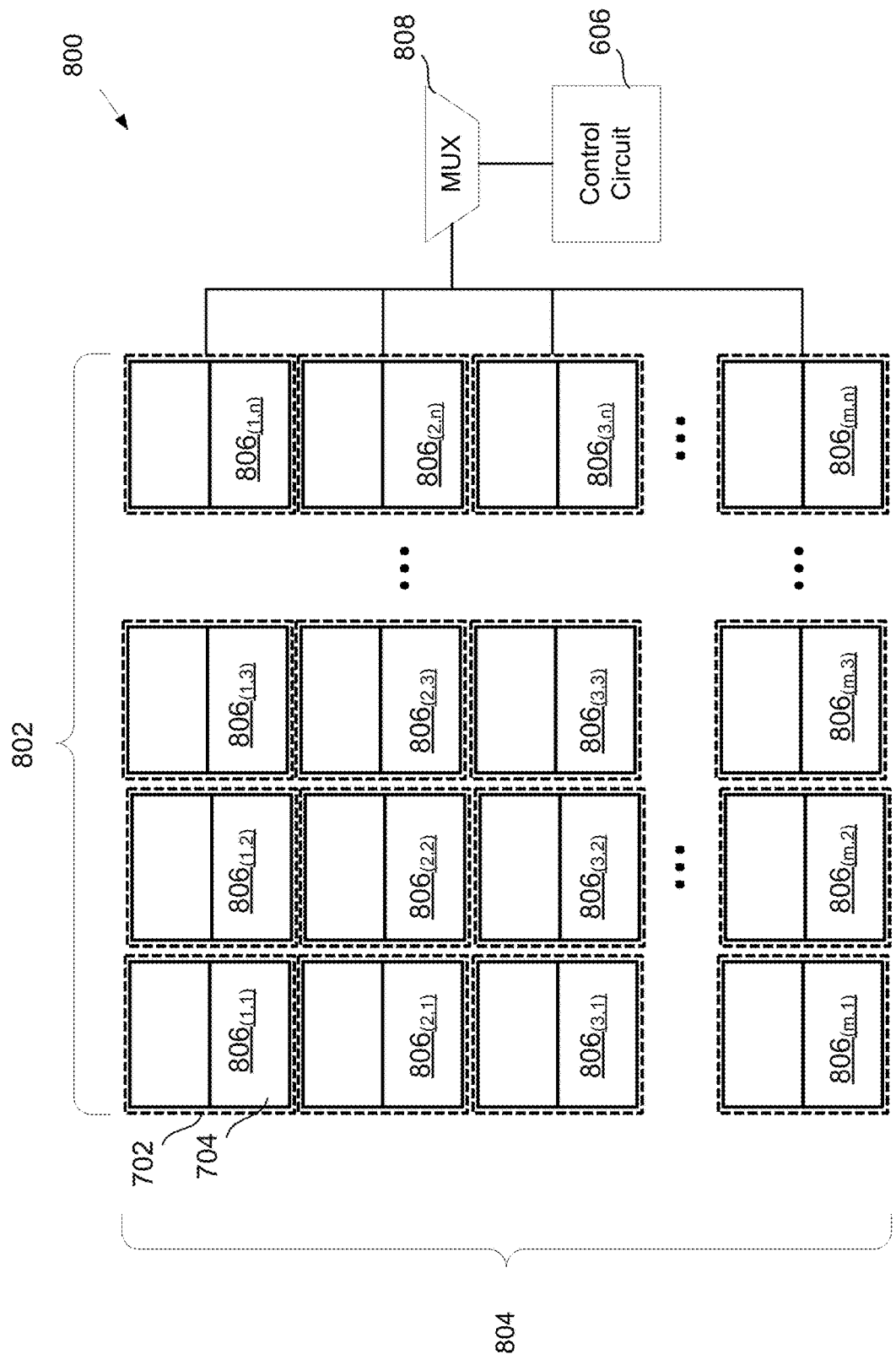
FIG. 8 is a schematic diagram of an exemplary FOD loop array.

Referring to FIG. 8, with further reference to FIG. 7A, a schematic diagram of an exemplary FOD loop array 800 is shown. As used herein, the term array means an ordered arrangement of FOD loops and is not limited to a specific geometric order or design. In an example, the FOD loop array 800 may include a variable number of individual FOD loops 806 arranged as grid spaces in a column and row configuration. Each FOD array column 802 and FOD array row 804 may include a plurality of FOD loops 806 (e.g., 'n' number of columns and 'm' number of rows). In an example, each FOD loop 806 includes a receiving loop 702 and a double-D transmitter loop 704 as described in FIG. 7A. Other FOD loop configurations may also be used (e.g., FIGS. 7B-7D). In an embodiment, one or more of the grid spaces in the FOD loop array 800 may not contain a FOD loop. The grid spaces in the FOD loop array 800 may be combined such that the combined grid space includes a single FOD loop (e.g., a relatively larger FOD loop). For example, grid areas containing FOD loops $806_{(2,2)}$, $806_{(2,3)}$, $806_{(3,2)}$ and $806_{(3,3)}$ may be combined to form a single FOD loop. Other examples of the FOD loop array 800 may include FOD loops of different geometric shapes such as an array of circular FOD loops, triangular FOD loops, and hexagonal FOD loops.

In operation, the control circuit 606 may include a multiplexer 808 configured to couple the transmitter 608 and the receiver 612 to each of the FOD loops 806 (i.e., via the respective transmitter loops 704 and receiving loops 702). The multiplexer 808 may be configured for concurrent transmission and reception with more than one FOD loops 806. In an example, the multiplexer 808 may be configured to enable transmission and reception with one or more FOD loops 806 periodically, or in a sequence (e.g., a FOD loop 806 every 10 ms, 20 ms, 100 ms, 500 ms, etc. . . . ).

Figure 9A:
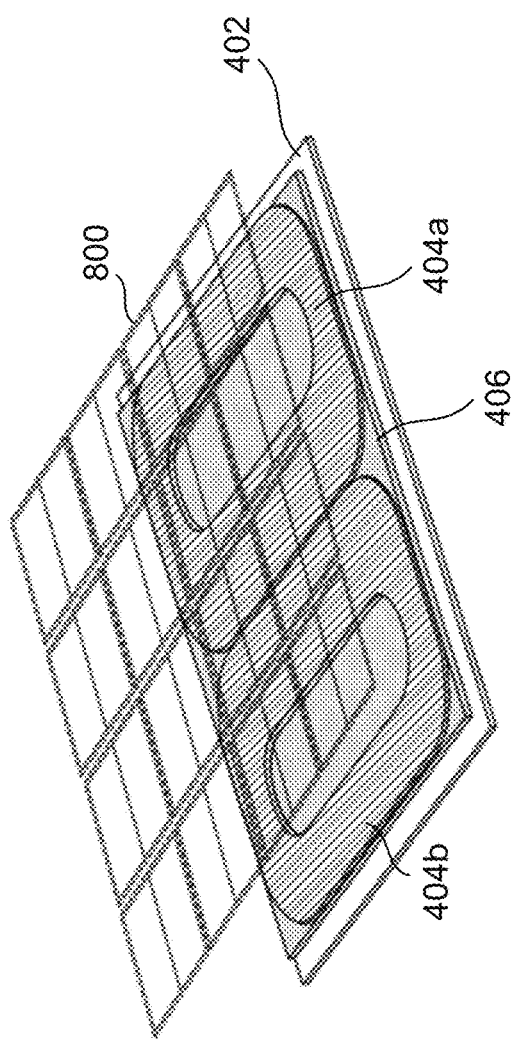
FIGS. 9A and 9B are diagrams of a FOD loop array and a base pad.
Figure 9B:
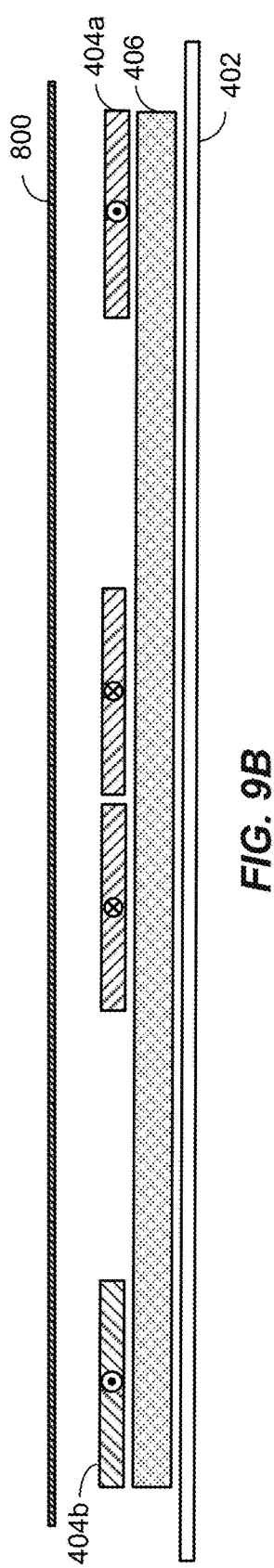

Referring to FIGS. 9A and 9B, with further reference to FIGS. 3, 4 and 8, a perspective diagram and a side-view diagram of a FOD loop array 800 and a magnetic flux device 402 are shown. In an example, the magnetic flux device 402 is a base pad for charging an electric vehicle and the FOD loop array 800 is located over the charging area. In this example, the magnetic flux device 402 may be installed at ground level and configured to provide an inductive power transfer to up to a vehicle base pad. Since a based pad that is installed in the ground is susceptible to foreign objects falling to the ground, the FOD loop array 800 is disposed on top of the base pad in an intervening location between the base pad and a potential foreign object. The dimensions and distances depicted in FIGS. 9A and 9B are provided for illustrative purposes and are not to scale. The first electrically conductive coil 404*a* and the second electrically conductive coil 404*b* are electrically isolated from the FOD loop array 800. That is, conductors in the first electrically conductive coil 404*a* and the second electrically conductive coil 404*b* are insulated from the transmitter and receiver loops in the FOD loop array 800. In an example, the FOD loop array 800 and the magnetic flux device 402 may be encapsulated within a single exterior casing (not shown) and installed as a single unit. The FOD loop array 800 may be the FOD loop 382 and may be operably coupled to a foreign object detection module 380 in the wireless charging system 302.

Figure 10:
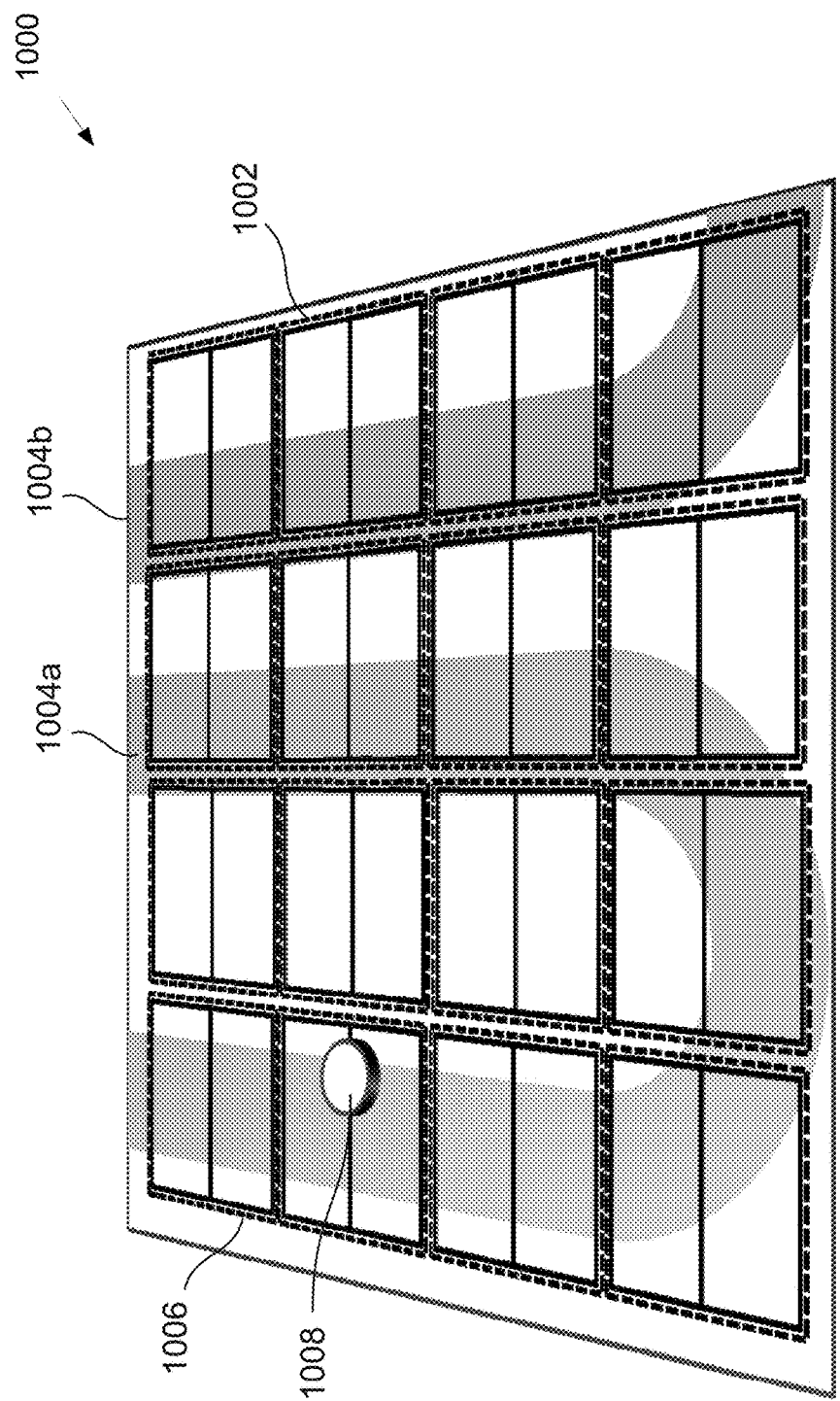
FIG. 10 is a diagram of a FOD loop array over a portion of a base pad.

Referring to FIG. 10, with further reference to FIG. 3, a diagram 1000 of a FOD loop array 1006 over a portion of a base pad 1002. The portion of the base pad 1002 includes a first conductor 1004*a* and a second conductor 1004*b* configured to inductively transfer power (e.g., via magnetic flux) to an electric vehicle, or other device configured for wireless power transfer. The portion of the base pad 1002 is an example of a charging area. The FOD loop array 1006 may include one or more FOD loops disposed over the base pad. The portion of the base pad 1002 may represent part of a modular base pad design such that multiple version of the base pad 1002 may be assembled to for a larger charging area. The FOD loop array 1006 may be integrated with the portion of the base pad 1002 and may be operably coupled to a controller (e.g., a foreign object detection module 380). In operation, a foreign object 1008 such as a coin, washer, nut, bolt, or other metallic object, may be located on the base pad. Prior to energizing, and during operation, the first conductor 1004*a* and the second conductor 1004*b*, the base charging system controller 342 may receive an indication from the foreign object detection module 380 that a foreign object has been detected by one or more of the FOD loops in the FOD loop array 1006. The base charging system controller 342 may be configured to notify a user via the base charging system communication interface that the foreign object has been detected. In an example, the user notification may include a relative position of the foreign object based on the location of the detecting FOD loop(s). When the foreign object 1008 is removed (i.e., as detected by the foreign object detection module 380), and the other charging conditions are satisfied, the base charging system controller 342 may be configured to energize the first conductor 1004*a* and the second conductor 1004*b* to commence charging.

Figure 11:
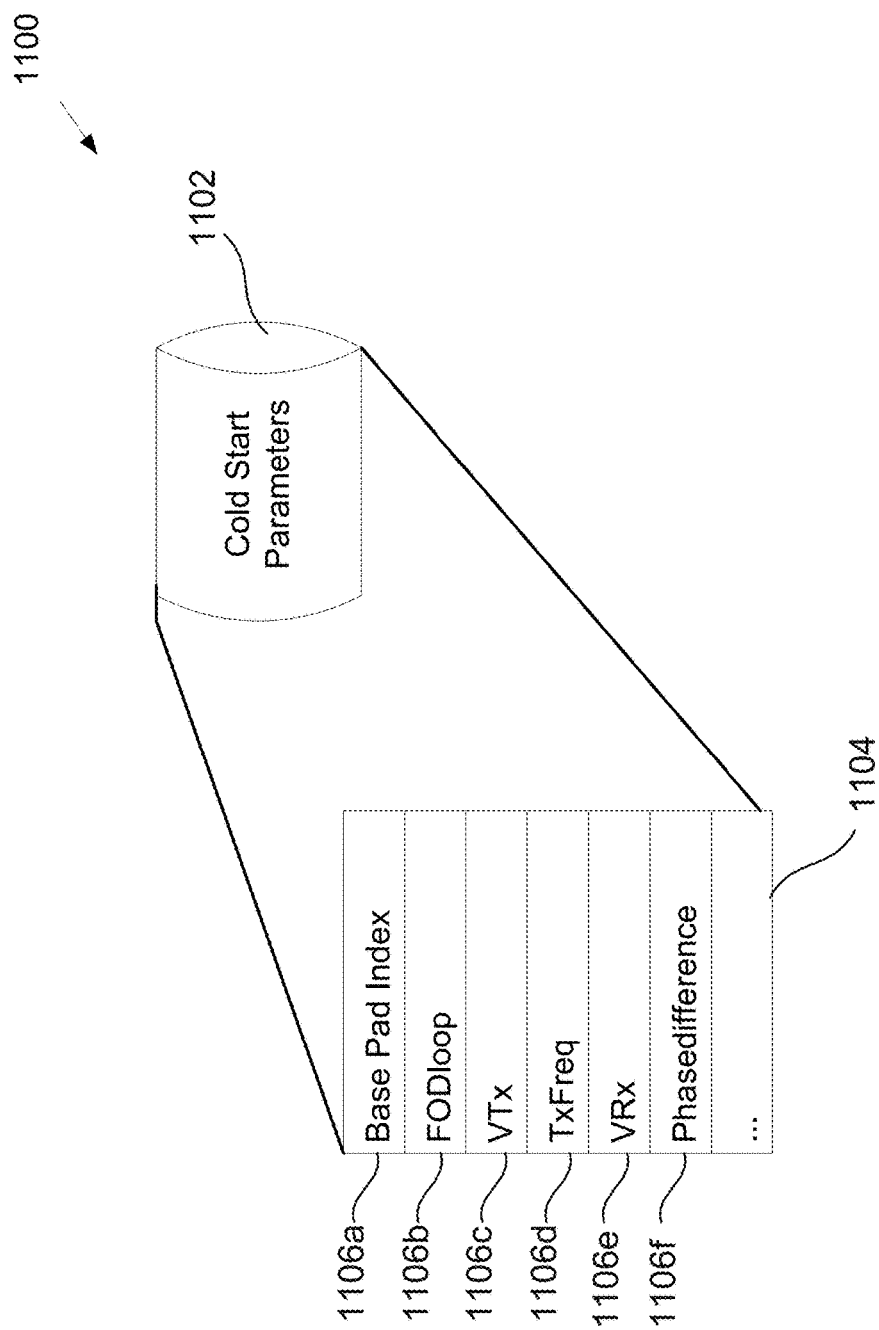
FIG. 11 is a data structure including electrical characteristics associated with one or more FOD loops.

Referring to FIG. 11, with further reference to FIG. 6, an example data structure including electrical characteristics associated with one or more FOD loops is shown. The data structure is exemplary only, and not a limitation, as additional tables, indexes, fields, and relationships may be used. In an example, the data structure 1100 includes a cold start parameters data source 1102 comprising a collection of data elements such one or more FOD loop data tables 1104. The data source 1102 may be a relational database (e.g., Oracle®, Microsoft SQL server, R:Base, etc.), a collection of flat files (e.g., XML), or a defined array in a programmable memory. Other persistent memory structures may also be used. The data source 1102 may be a component of the distribution center 130, or a component of the foreign object detection module 380 (e.g., the memory unit 618). The data table 1104 includes records containing electrical characteristics (e.g., signal information) associated with one or more FOD loops. A base pad index field 1106*a* may be used to associate the FOD loop information (e.g., data record) with a particular base pad and the associated power settings for the base pad. For example, in a charging solution with multiple base pads, such as a dynamic charging base array network (BAN), the data source 1102 may be indexed on each individual base pad. A FODloop field 1106*b* may be used to associate the FOD loop information with an individual FOD loop in a FOD loop array. For example, each FOD loop 806 (e.g., $806_{(1,1)}$, $806_{(23)}$, $806_{(m,n)}$, etc. . . . ) in the FOD loop array 800 may be associated with a record in the data table 1104. A Voltage Transmission (VTx) field 1106*c* contains information relating to the transmission signal generated by the transmitter 608. In an example, the VTx field 1106*c* indicates the amplitude value (e.g., peak-to-peak voltage) of the signal in the transmitter loop 704 of a FOD loop 806. A transmitter frequency (TXFreq) field 1106*d* may indicate the frequency value of the transmitted signal generated by the transmitter 608. A Voltage Received (VRx) field 1106*e* may be used to indicate the expected electrical characteristic on a receiving loop 702. In an example, the VRx field 1106*e* is the amplitude value (e.g., peak-to-peak voltage) of the signal detected by the receiving loop 702 as measured at the detector 610 (e.g., after filtering). In an example, the VRx field may be an indication of the change between the received signal and the transmitted signal (e.g., a percent change). In an example, the expected electrical characteristic may be approximately a zero voltage value (e.g., less than 1% of the transmitted signal) because there is substantially no mutual coupling between the transmitting and receiving loops. The VRx field 1106*e* may also be established empirically and may indicate a signal value when no foreign objects are near the respective FOD loop. The VRx field 1106*e* may also be impacted by (i.e., compensate for) a noise component caused by the base pad, other FOD loops in the FOD loop array, as well as other propagation considerations such as the physical layout of the FOD loop relative to the base pad structure (e.g., nearby conductors, edge effects, base pad grounding configurations). The phase difference field 1106*f* represents the expected phase difference value (e.g., 2 ns, 5 ns, 6 ns, 10 ns, etc. . . . ) between the transmitted signal and the received signal. The phase difference field 1106*f* represents the expected phase difference when no foreign objects are near the respective FOD loop. The phase difference field 1106*f* may be also established empirically at the time a base pad system is installed and tested, or periodically as required (i.e., modifications to the base pad installation, observed changes in FOD sensitivity, regularly scheduled maintenance, etc. . . . ). Since the VRx field 1106*e* and the phase difference field 1106*f* may be determined after installation, the respective values may provide for allowances for any system nonlinearities which may have eluded the design modeling process. The VRx field 1106*e* and the phase difference field 1106*f* are example of receiver signals that may be determined based on the associated transmission signal (e.g., VTx field 1106*c* and TXFreq field 1106*d*). In an example, the VRx field 1106*e* and the phase difference field 1106*f* may be used as threshold values by the detector 610 to determine if a foreign object is interacting with the signal transmitted by the transmitter loop 704. The cold start parameters data source 1102 may be used to define the expected steady state operation of the FOD loop array 800 (i.e., when the base pad is clear of foreign objects), and enable detection of foreign objects when the wireless charging system 302 transitions from a secured state (i.e., off) to a powered state (e.g., ready to charge). The data fields in the data table 1104 are exemplary only, and not a limitation, as other data fields may be used to define the measured signal responses associated with the FOD loop array 800.

Figure 12:
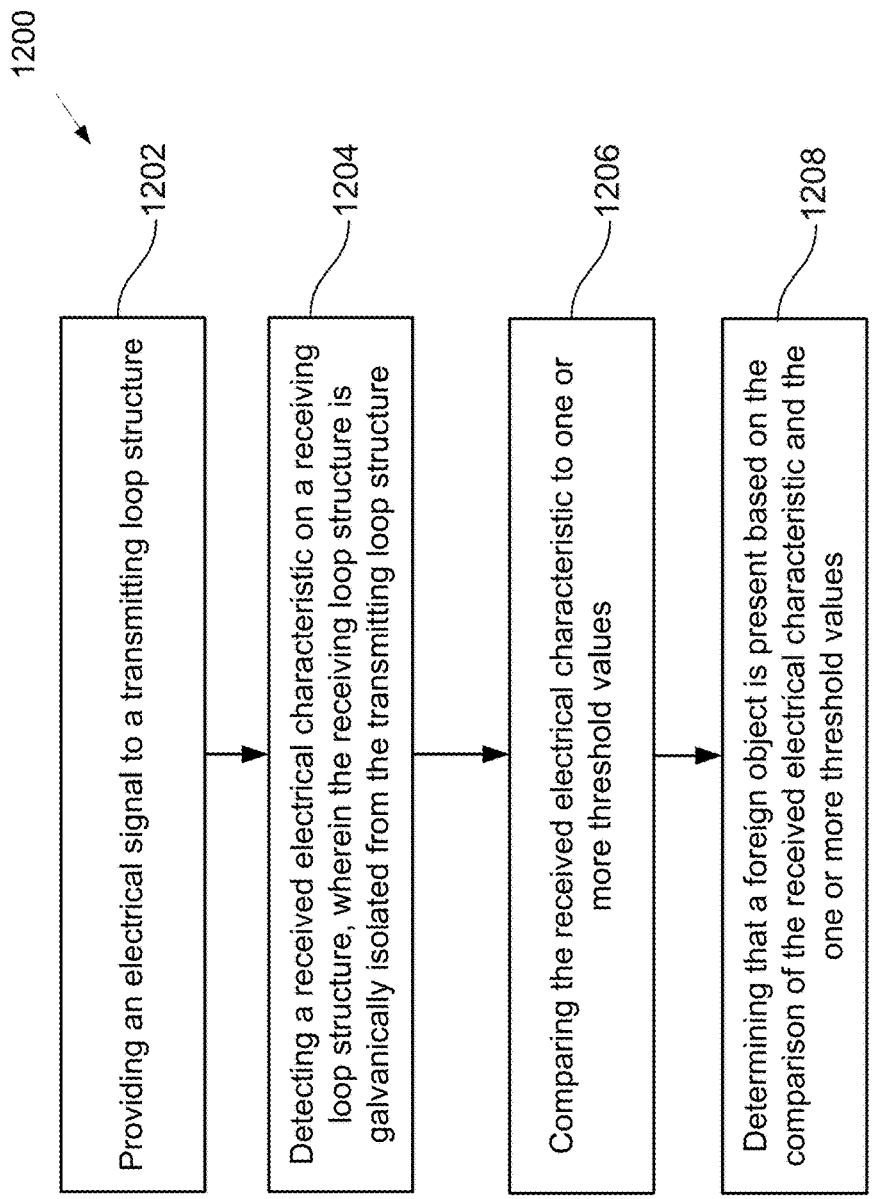
FIG. 12 is a process diagram for detecting a foreign object with a FOD loop.

Referring to FIG. 12, with further reference to FIGS. 3, 6 and 7A-7D, a process 1200 for detecting a foreign object with a FOD loop includes the stages shown. The process 1200, however, is exemplary only and not limiting. The process 1200 may be altered, e.g., by having stages added, removed, or rearranged.

At stage 1202, the foreign object detection module 380 is configured to provide an electrical signal to a transmitting loop structure. The foreign object detection module 380 includes a control circuit 606 with a transmitter 608. The transmitter 608 may be a means for providing an electrical signal to the transmitting loop structure. The transmitter 608 is configured to generate an electrical signal for transmission by the transmitting loop structure such as a transmitter loop 604. In an example, the electrical signal is an oscillating wave form at a frequency of between 1 to 10 MHz, and an amplitude at a value between 1 and 5 volts peak-to-peak. The transmitting loop may be a single loop or a multi-loop structure (e.g., double-D configuration). The transmitting loop may comprise a FOD loop array structure with multiple transmitting loops in an ordered arrangement. In an example, the individual transmitting loops in a FOD loop array may be operably coupled to the control circuit 606 via a multiplexer.

At stage 1204, the foreign object detection module 380 is configured to detect a received electrical characteristic (e.g., signal) on a receiving loop structure, such that the receiving loop structure is galvanically isolated from the transmitting loop structure. The foreign object detection module 380 includes the control circuit 606 with a receiver 612 and a filter 614. The receive 612 is operably coupled to the receiving loop structure and may be a means for detecting the received electrical characteristic. The receiving loop may be a single loop or a multi-loop structure (e.g., double-D configuration). Exemplary arrangements of galvanic isolation between a transmitting loop structure and a concentric receiving loop structure are depicted in FIGS. 7A-7D. The received electrical characteristic may be filtered via the filter 614 to increase the signal-to-noise ratio in the received electric signal. For example, noise generated by a charging coil may excite the receiving loop structure and degrade the quality of the received electrical characteristic. The filter 614 may be a narrow band-pass filter centered on the frequency of the electrical signal provided to the transmitting loop structure at stage 1202.

At stage 1206, the foreign object detection module 380 is configured to compare the received electrical characteristic to one or more threshold values. The control circuit 606 in the foreign object detection module 380 includes a detector 610, a processor unit 616 and a memory unit 618. The detector 610 may be a means for comparing the received electrical characteristic to one or more threshold values. The detector 610 may detect a change in the electrical characteristics such as the amplitude and phase in the received signal. The detector 610 receives the filtered received electric signal (e.g., after the filter 614) and may be configured to determine an amplitude and/or a phase of the received electrical characteristic as compared to the transmitted electrical signal. In an example, the detector 610 is configured to determine a percent change in the amplitude of the received electric signal as compared to the transmitted electrical signal. The percent change in the amplitude may be compared to a threshold value stored in the memory unit 618. The memory unit 618 may include a data table 1104 with a VRx field 1106e indicating an expected percent change. In an example, the detector 610 is configured to determine an absolute value (e.g., peak-to-peak or Root Mean Square (RMS)) of the amplitude of the received electric signal. The absolute value of the amplitude may be compared to a threshold value stored in the memory unit 618. The memory unit 618 may include a data table 1104 with a VRx field 1106e indicating an absolute value of the received electrical characteristic. In an example, the detector 610 is configured to determine a phase difference the received electric signal as compared to the transmitted electrical signal. The phase difference may be compared to a threshold value stored in the memory unit 618. The memory unit 618 may include a data table 1104 with a phase difference field 1106f indicating an expected phase difference. The threshold values (e.g., VRx, phase difference) may persist on a remote server which may be accessible to the detector 610 via the network interface 622. The detector 610 is configured to compare the values of the received electrical characteristic with the corresponding threshold values to determine a difference between the two values, if any. In an embodiment, the threshold value may be approximately zero (e.g., less than 1% of the signal on the transmitting loop) and the detector 610 is configured to detect a non-zero induced voltage appearing in the receiving loop 602.

At stage 1208, the foreign object detection module 380 is configured to determine that a foreign object is present based on the comparison of the received electrical characteristic and the one or more threshold values. The detector 610 in the control circuit 606 may be a means for determining that a foreign object is present. The comparison of the received electrical characteristic with the one or more threshold values may indicate a difference between the two respective values. A magnitude of the difference value may be used to determine that a foreign object is present. For example, a +/−5 percent change in the magnitude of the amplitude of the received electrical characteristic as compared to the threshold value is sufficient to indicate that a foreign object is present. A phase difference of +/−5 degrees between the received electrical characteristic and the threshold value is sufficient to indicate that a foreign object is present. The +/−5 percent and +/−5 degrees values are exemplary only, and not a limitation, as the sensitivity of a FOD loop may be adjusted by substituting lower or higher values. The change in amplitude and/or phase may be stored as different detection threshold values in the data structure 1102. The processor unit 616 may be configured to send a FOD indication message via that network interface 622 to indicate whether a foreign object is or is not detected. The wireless charging system 302 may provide a notification a user and commence or cease charging as appropriate in response to receiving the FOD indication message.

Figure 13:
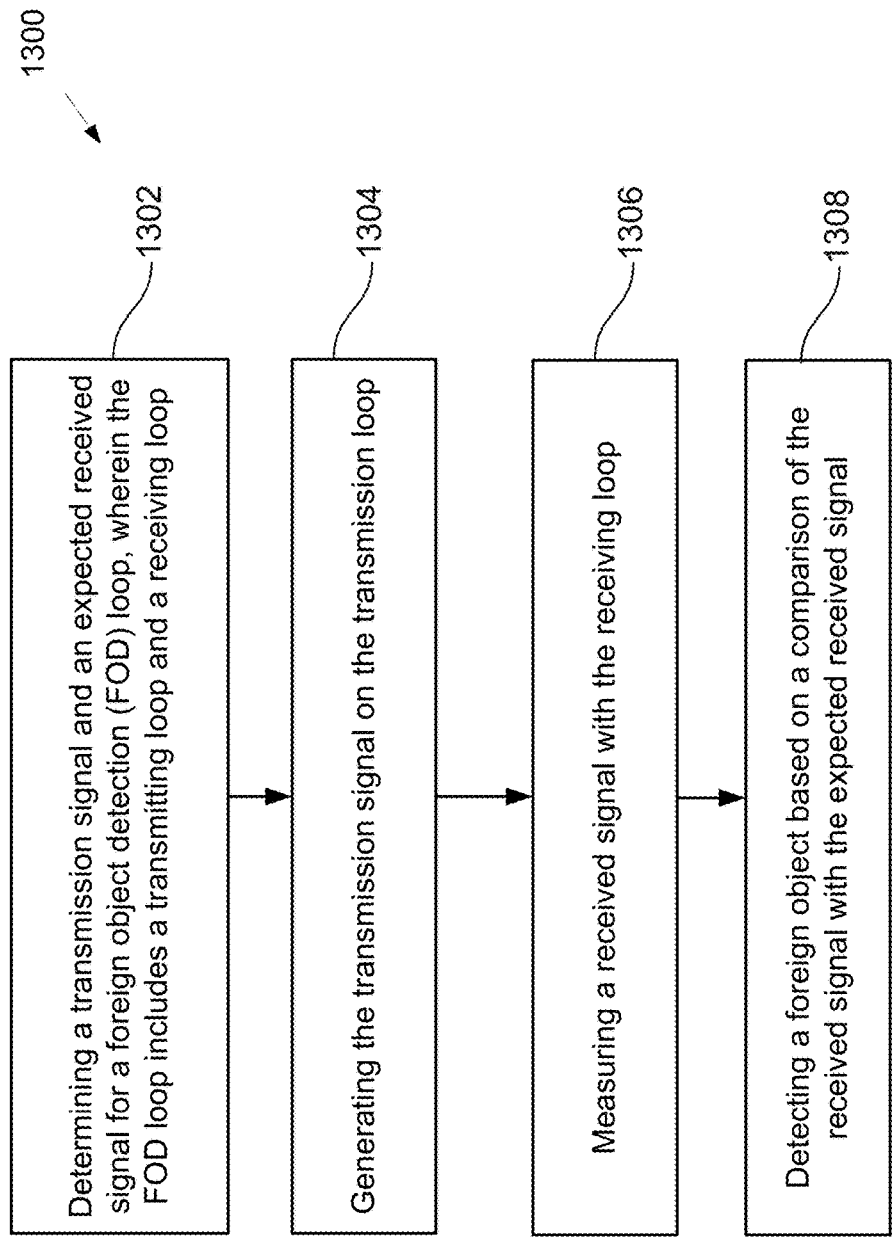
FIG. 13 is a process diagram for detecting a foreign object with a FOD loop on a cold start.

Referring to FIG. 13, with further reference to FIGS. 3, 6 and 7A-7D, a process 1300 for detecting a foreign object with a FOD loop on a cold start includes the stages shown. The process 1300, however, is exemplary only and not limiting. The process 1300 may be altered, e.g., by having stages added, removed, or rearranged.

At stage 1302, the foreign object detection module 380 is configured to determine a transmission signal and an expected received signal for a foreign object detection (FOD) loop, such that the FOD loop includes a transmitter loop and a receiver loop. In operation, the wireless charging system 302 may be placed on a secured state (e.g., turned off) and the foreign object detection module 380 may also be powered down. In this state, any foreign objects disposed on a base pad will not be detected. When the wireless charging system 302 is powered up there is a need to determine if a foreign object is present before initiating charging operations. The foreign object detection module 380 may be operably coupled to the cold start parameters data source 1102 via a network connection. The processor unit 616 in the control circuit 606 may be a means for determining the transmission signal and the expected received signal for a FOD loop. For example, the processor unit 616 in the control circuit 606 may be configured to send a select query (e.g., a stored procedure) via the network interface 622 including one or more base pad index values and one or more FODloop index values. The cold start parameters data source 1102 may be configured to provide the select query results via the network interface 622, such that the query results include a transmission signal (e.g., VTx and TxFreq) and an expected received signal (e.g., VRx and/or phase difference) associated with the one or more FOD loops. In an example, the transmission signal and the expected received signal information may persist locally in the memory unit 618 and may be accessed by the processor unit 616 without utilizing the network interface 622.

At stage 1304, the foreign object detection module 380 is configured to generate the transmission signal on a transmission loop. The transmitter 608 in the control circuit 606 may be a means for generating the transmission signal. The transmission signal is based on the previously stored parameters VTx and TxFreq determined at stage 1302. The transmitter 608 may be operably coupled to one or more transmitter loops 604 (e.g., via a multiplexer). In an embodiment, the transmission signal may vary for different transmitter loops in a FOD loop array.

At stage 1306, the foreign object detection module 380 is configured to measure a received signal with the receiving loop 602. The detector 610 in the control circuit 606 may be a mean for measuring a received signal. The receiver 612 may be operably coupled to one or more receiving loops 602 (e.g., via a multiplexer) and is configured to detect signals based on the TxFreq value. The received signal may be subsequently processed by the filter 614 to increase the signal-to-noise ratio. The filter 614 may be an analog circuit or may be one or more digital signal processing algorithms. The filter 614 may be a bandpass filter based on the TxFreq value. The detector 610 is configured to determine the amplitude and phase of the received signal. The values for the amplitude and phase of the received signal may be stored in the memory unit 618.

At stage 1308, the foreign object detection module 380 is configured to detect a foreign object based on a comparison of the received signal with the expected received signal. The processor unit 616 in the control circuit 606 may be a means for detecting a foreign object based on the comparison. The processor unit 616 may receive the amplitude and/or phase values for one or more received signal from the detector 610 or the memory unit 618. Each of the amplitudes of the received signal may be compared to the corresponding VRx value determined at stage 1302 (i.e., based on the FOD loop index). The phase of the one or more received signals may be compared to the corresponding phase difference value received at stage 1302 (i.e., based on the FOD loop index). The processor unit 616 may be configured to determine that a foreign object is present of the amplitude and/or phase values of the received signal do not match, or are greater than an established deviation amount. For example, if the difference in the amplitude values is greater than 5%, the processor unit 616 may be configured to send a foreign object indication via the network interface. If the difference between the phase values is greater than 2%, the processor unit 616 may send the foreign object indication. Other combinations of amplitude and phase results may be used detect a foreign object. In an example, the phase results may have a tighter deviation tolerance because the phase is less susceptible to the noise generated by a charging pad.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for detecting a presence of a foreign object within a region for wirelessly transferring power to charge an electric vehicle, the apparatus comprising:
    a foreign object detection (FOD) structure including:
        a transmitting loop structure;
        a receiving loop structure galvanically isolated from the transmitting loop structure and positioned relative to the transmitting loop structure such that a magnetic field generated by the transmitting loop structure induces a first voltage in the receiving loop structure, wherein the first voltage is below a threshold value; and
    a control circuit configured to drive the transmitting loop structure and detect a change in a magnitude of the first voltage in the receiving loop structure in response to the presence of the foreign object within the magnetic field.

2. The apparatus of claim 1 wherein the threshold value is approximately zero.

3. The apparatus of claim 1 wherein the receiving loop structure is a circular configuration.

4. The apparatus of claim 1 wherein the transmitting loop structure is a double-D configuration.

5. The apparatus of claim 1 wherein the receiving loop structure is a double-D configuration.

6. The apparatus of claim 1 wherein a transmitter magnetic flux direction of the transmitting loop structure is different from a receiver magnetic flux direction of the receiving loop structure.

7. The apparatus of claim 1 wherein the control circuit is configured to cause a wireless transfer of power to cease or be reduced if the change in the magnitude of the first voltage in the receiving loop structure is above a detection threshold value.

8. The apparatus of claim 1 further comprising a plurality of FOD loop structures arranged in an array over a charging area, each of the plurality of FOD loop structures including the transmitting loop structure and the receiving loop structure, wherein the control circuit is configured to drive each of the transmitting loop structures and detect changes in the magnitude of the first voltage in each of the receiving loop structures.

9. The apparatus of claim 8 wherein the control circuit is configured to cause a wireless transfer of power to cease or be reduced if the change in the magnitude of the first voltage in one of the receiving loop structures is above a detection threshold value associated with that one of the receiving loop structures.

10. The apparatus of claim 1 wherein the control circuit is configured to drive the transmitting loop structure at a frequency between 1 MHz and 10 MHz.

11. The apparatus of claim 1 wherein the control circuit is configured to drive the transmitting loop structure based on previously stored transmission signal parameters and to detect the change in the magnitude of the first voltage in the receiving loop structure based on expected received signal parameters, wherein the expected received signal parameters are associated with the transmission signal parameters.

12. The apparatus of claim 1 further comprising a data structure operably coupled to the control circuit, wherein the data structure includes:
a first field to identify the receiving loop structure; and
a second field to identify the threshold value associated with the receiving loop structure.

13. A method of detecting a foreign object on a wireless charging base pad, comprising:
determining a transmission signal and an expected received signal for a foreign object detection (FOD) loop, wherein the FOD loop includes a transmitting loop and a receiving loop, wherein the transmitting loop is a double-D, circular, or circular-rectangular configuration;
generating the transmission signal on the transmitting loop;
measuring a received signal with the receiving loop; and
detecting the foreign object based on a comparison of the received signal with the expected received signal.

14. The method of claim 13 wherein the receiving loop is a double-D, circular, or circular-rectangular configuration.

15. The method of claim 13 wherein the FOD loop is one of a plurality of FOD loops in an FOD array and the method includes determining the transmission signal and the expected received signal for each of the plurality of FOD loops in the FOD array.

16. The method of claim 13 wherein determining the transmission signal and the expected received signal includes receiving the transmission signal and the expected received signal via a network interface.

17. The method of claim 13 wherein the transmission signal includes an amplitude value and a frequency value.

18. The method of claim 13 wherein the expected received signal includes an amplitude value.

19. The method of claim 13 wherein the expected received signal includes a phase difference value.

20. A foreign object detection apparatus, comprising:
a transmitting loop structure in a first magnetic flux orientation;
a receiving loop structure in a second magnetic flux orientation, wherein the receiving loop structure is galvanically isolated from the transmitting loop structure and positioned relative to the transmitting loop structure such that a magnetic field generated by the transmitting loop structure generates an expected electrical characteristic in the receiving loop structure;
a control circuit configured to drive the transmitting loop structure and detect a change in the expected electrical characteristic in the receiving loop structure in response to a presence of a foreign object within the magnetic field; and
a memory unit operably coupled to the control circuit and configured to store an expected electrical characteristic value corresponding to the expected electrical characteristic value the transmitting loop structure generates in the receiving loop structure.

21. The foreign object detection apparatus of claim 20 wherein the first magnetic flux orientation and the second magnetic flux orientation are the same.

22. The foreign object detection apparatus of claim 20 wherein the expected electrical characteristic in the receiving loop structure is approximately a zero voltage value.

23. The foreign object detection apparatus of claim 20 wherein the transmitting loop structure is a double-D configuration.

24. The foreign object detection apparatus of claim 20 wherein the receiving loop structure is a double-D configuration.

25. The foreign object detection apparatus of claim 20 wherein the changes in the expected electrical characteristic include a phase change appearing in the receiving loop structure in response to the presence of the foreign object within the magnetic field.

26. The foreign object detection apparatus of claim 20 further comprising a plurality of Foreign Object Detection (FOD) loop structures arranged in an array over a charging area, each of the plurality of FOD loop structures including the transmitting loop structure and the receiving loop structure, wherein the control circuit is configured to drive each of the transmitting loop structures and detect changes in an electrical characteristic in each of the receiving loop structures.

27. The foreign object detection apparatus of claim 26 wherein the memory unit is configured to store an electrical characteristic value corresponding to the electrical characteristic values for each of the transmitting loop structures in the plurality of FOD loop structures.

28. An apparatus for detecting a foreign object, comprising:
means for determining a transmission signal and an expected received signal for a foreign object detection (FOD) loop, wherein the FOD loop includes a transmitting loop means in a first magnetic flux orientation and a receiving loop means in a second magnetic flux orientation such that an induced voltage in the receiving loop means is approximately zero in the absence of the foreign object;

means for generating the transmission signal on the transmitting loop means;

means for measuring a received signal with the receiving loop means; and means for detecting the foreign object based on a comparison of the received signal with the expected received signal.

29. The apparatus of claim 28 further comprising means for storing the expected received signal.

* * * * *